Oct. 7, 1958 P. HINTZ 2,855,169
ADJUSTABLE SUPPORT
Filed April 21, 1955
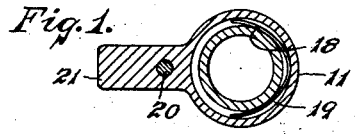
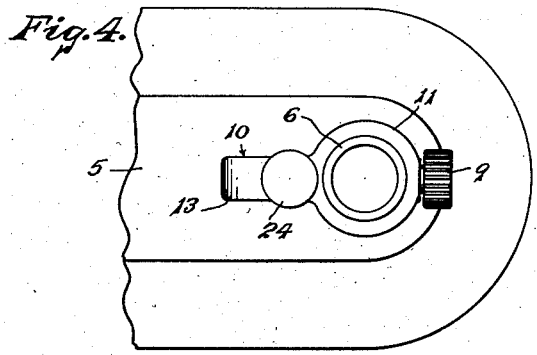
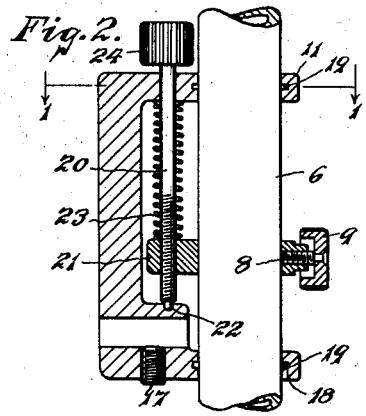
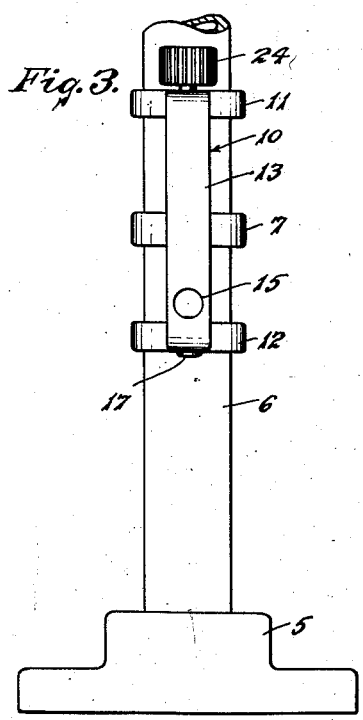
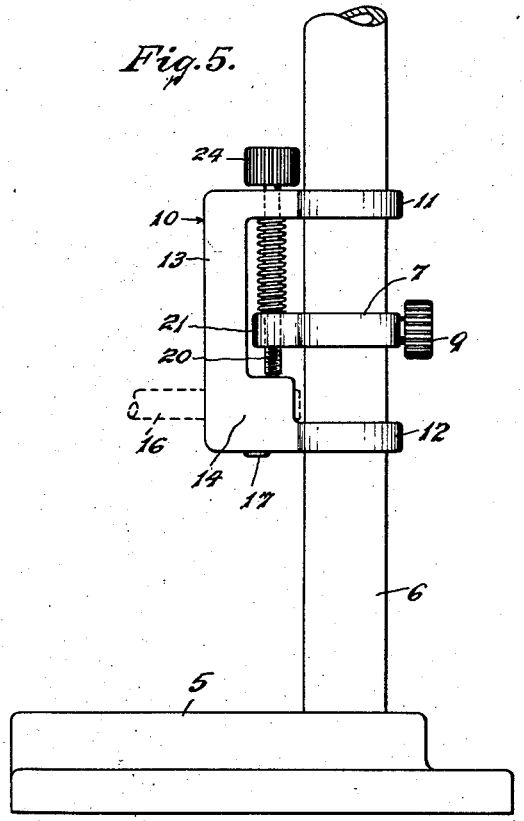
INVENTOR.
PHILIP HINTZ.
BY
Louis V. Lucia
ATTORNEY.

United States Patent Office 2,855,169
Patented Oct. 7, 1958

2,855,169
ADJUSTABLE SUPPORT
Philip Hintz, Cromwell, Conn.

Application April 21, 1955, Serial No. 502,866

3 Claims. (Cl. 248—125)

This invention relates to an adjustable support for gauges and the like, and more particularly to a support which is intended for adjustably supporting dial indicator gauges of conventional types.

An object of this invention is to provide such a support which is easily adjustable to accurately locate an instrument, such as an indicator or the like, at a desired height for taking measurements.

A further object is the provision of a support which is economical to produce and which can be adjusted within very fine limits to accurately locate a gauge or other instrument supported thereby relatively to an article or member being gauged.

Further objects and advantages of this invention will be more clearly understood from the following description and the accompanying drawings in which:

Fig. 1 is a sectional view on line 1—1 of Fig. 2.

Fig. 2 is a side view, partly in central vertical section, illustrating the carrier unit of my improved support.

Fig. 3 is a front view of said support.

Fig. 4 is a plan view thereof.

Fig. 5 is a side view.

As illustrated in the drawing, the said support preferably includes a base 5 having thereon a vertically disposed post 6.

The present invention is particularly directed to the provision of an improved carrier unit which includes a supporting member 7 that is slidably adjustable on the post 6 and secured in any position thereon by means of a clamping screw 8 having a knurled head 9. The said unit also includes a C-shaped carrier member 10 having ring-shaped upper and lower leg portions 11 and 12, respectively, which closely fit over the post 6 and are slidable thereon, and a connecting portion 13 therebetween. The said connecting portion has an inwardly extending boss 14 with a transversely disposed hole 15 therein that is adapted to receive the shank, indicated at 16, of an instrument, such as a dial indicator gauge, scriber, or the like, which is to be mounted upon my improved support. A clamping screw 17 is threaded to the said carrier member and extends into said hole for clamping the shank thereto.

The said carrier member is held firmly in engagement with the post 6 by means of tensioning springs 18 which are contained in annular grooves 19 in the walls of the openings in the leg portions 11 and 12; the said springs being held under tension between the bottoms of said grooves and the surface of the post 6 to eliminate looseness between the carrier member and the post which could interfere with the accuracy of a measuring instrument mounted for said support and to prevent accidental dropping of the supporting unit on the post, when the clamping screw 8 is loosened, and thereby avoid possible damage to the delicate mechanism of the instrument.

The carrier member 10 is adjustably connected to the supporting member 7 by means of an adjusting screw 20 which extends through a vertical hole in a portion 21 of said supporting member and is threaded thereto. The said adjusting screw abuts the top of the boss 14, to force the carrier member in a downward direction, and is preferably provided with a point that is rotatable in a recess 22 in said boss to provide a bearing for the adjusting screw.

A compression spring 23 surrounds the adjusting screw 20 and is contained between the portion 21 of the supporting member and the bottom of the upper leg portion 11 so as to bias the carrier member 10 in an upward direction into abutment with the lower end of the said adjusting screw and thereby yieldingly support the carrier member upon the supporting member.

The adjusting screw 20 is preferably provided with a knurled head 24 to facilitate rotation thereof with the finger.

In the use of my improved support, the shank 16 of the instrument to be supported is first inserted in the hole 15 and the clamping screw 17 is then tightened to secure the instrument to the carrier member 10. The entire carrier unit and the instrument is then raised or lowered upon the post 6 to approximately locate the instrument at the desired height and the clamping screw 8 is then tightened to secure the supporting member 7. Close and accurate height adjustment of the instrument is then made by rotating the adjusting screw 20 by its head 24. This will raise or lower the said carrier member firmly in abutment with the end of the adjusting screw and securely support the said carrier member with the instrument thereon in adjusted position upon the post 6.

It will be noted that approximate adjustment of the instrument may be quickly and easily made by simply loosening the screw 8, raising or lowering the entire carrier unit, with the instrument thereon, and tightening said screw upon the post. Close and accurate adjustment of the instrument may then be readily made by simply rotating the adjusting screw 20 to raise or lower the carrier member 10 relatively to the supporting member 7.

I claim:

In a support including a base and a post extending vertically from said base, a carrier unit slidable on said post and including a C-shaped carrier member slidable on said post and having upper and lower leg portions and a connecting portion therebetween, the said leg portions having openings therein to slidably receive the post, an abutment portion on the lower leg portion, a supporting member slidable on said post and disposed between the upper leg portion and the said abutment portion, clamping means for securing said supporting member to the post, an adjusting screw extending through and freely rotatable in an opening in the upper leg portion and threaded to and extending below the supporting member and having its lower free end portion in engagement with said abutment, a compression spring surrounding said adjusting screw and contained between the upper leg portion and the supporting member; the said compression spring forcing the carrier member upwardly relatively to the supporting member and thereby retaining the abutment portion in engagement with the end of said adjusting screw and locating the carrier member in different positions upon the post in accordance with the adjustment of said screw relatively to the supporting member, and means in said carrier member for mounting an instrument thereon.

2. A support including a base having a post thereon and a carrier unit slidable on said post, said carrier unit including a C-shaped carrier member having upper and lower leg portions and slidable on said post, a supporting member slidable on said post and disposed between the said leg portions, a screw for clamping said supporting member in different positions upon the post, a compression spring contained between said supporting member and the carrier member for yieldingly urging said carrier in one direction relatively to the supporting member, an adjusting screw threaded to the supporting member and having a free end portion abutting the carrier for slidably moving the carrier member upon the post against the force of said spring, and means in said carrier member for detachably mounting an instrument thereon.

3. A support for a height gauge or the like including a vertically disposed post and a carrier unit slidably mounted on said post, the said carrier unit including a C-shaped carrier member having an upper and a lower leg portion, a connecting portion parallel to and spaced from the post, an abutment on said carrier member between the connecting portion thereof and the post, a ring-shaped supporting member slidably mounted on said post between said leg portions and having a supporting portion extending between the post and the connecting portion of the carrier member, an adjusting screw extending through an opening in the upper leg member and through the said supporting portion, the said adjusting screw being slidable in the upper leg portion and threaded to the supporting portion, the end of said screw being aligned with said abutment, a compression spring surrounding the said adjusting screw and contained between the upper leg portion and the supporting portion of the supporting member, the said compression spring yieldingly biasing the carrier member relatively to the supporting member and thereby retaining the end of the adjustment screw in engagement with the abutment on the carrier member, the said carrier member being closely adjustable on said post relatively to the supporting member by rotation of said screw and retained against movement relatively to said supporting member in one direction by the compression spring and in the opposite direction by the end of the adjusting screw, the said carrier member having an opening therein to receive a separate member of an instrument to be supported thereby, and a screw threaded to said carrier member and engageable with said separate member for detachably securing the instrument to the carrier member.

References Cited in the file of this patent

UNITED STATES PATENTS

| | | |
|---|---|---|
| 344,738 | Hollingsworth et al. | June 29, 1886 |
| 544,216 | Droste | Aug. 6, 1895 |
| 755,847 | Clarkson | Mar. 29, 1904 |
| 1,680,836 | Albright | Aug. 14, 1928 |
| 1,701,258 | Clement et al. | Feb. 5, 1929 |
| 2,469,904 | Szuba | May 10, 1949 |
| 2,526,322 | Black | Oct. 17, 1950 |